United States Patent
Lopez et al.

(10) Patent No.: US 12,105,254 B2
(45) Date of Patent: Oct. 1, 2024

(54) ELEMENT FOR COVERING THE PROJECTION APERTURE OF A HEADS-UP DISPLAY DEVICE

(71) Applicants: PSA AUTOMOBILES SA, Poissy (FR); CENTRE NATIONAL DE LA RECHERCHE SCIENTIFIQUE, Paris (FR); UNIVERSITE PARIS-SUD, Orsay (FR)

(72) Inventors: Thomas Lopez, Paris (FR); David Barat, Clamart (FR); Laetitia Pradere, Bievres (FR); Béatrice Dagens, Antony (FR)

(73) Assignees: STELLANTIS AUTO SAS, Poissy (FR); CENTRE NATIONAL DE LA RECHERCHE SCIENTIFIQUE, Paris (FR); UNIVERSITE PARIS-SUD, Orsay (FR)

( * ) Notice: Subject to any disclaimer, the term of this patent is extended or adjusted under 35 U.S.C. 154(b) by 349 days.

(21) Appl. No.: 17/638,305

(22) PCT Filed: Aug. 20, 2020

(86) PCT No.: PCT/FR2020/051487
§ 371 (c)(1),
(2) Date: Feb. 25, 2022

(87) PCT Pub. No.: WO2021/048480
PCT Pub. Date: Mar. 18, 2021

(65) Prior Publication Data
US 2022/0326414 A1    Oct. 13, 2022

(30) Foreign Application Priority Data
Sep. 11, 2019    (FR) ...................................... 1909989

(51) Int. Cl.
*G02B 1/18*    (2015.01)
*G02B 1/116*    (2015.01)
*G02B 27/01*    (2006.01)

(52) U.S. Cl.
CPC ................ *G02B 1/18* (2015.01); *G02B 1/116* (2013.01); *G02B 27/0101* (2013.01)

(58) Field of Classification Search
None
See application file for complete search history.

(56) References Cited

U.S. PATENT DOCUMENTS

| 5,973,316 | A | * | 10/1999 | Ebbesen | ................ | B82Y 35/00 |
|  |  |  |  |  |  | 430/5 |
| 6,040,936 | A | * | 3/2000 | Kim | ................... | G02F 1/13338 |
|  |  |  |  |  |  | 359/251 |
| 2020/0341271 | A1 | * | 10/2020 | Fuchida | ............... | G02B 5/3083 |

FOREIGN PATENT DOCUMENTS

| FR | 3044113 A1 | 5/2017 |
| FR | 3049071 A1 | 9/2017 |

(Continued)

OTHER PUBLICATIONS

Magno et al (Integrated magneto plasmonic nanostructures for non-reciprocal optical devices, Asia Communications and Photonics Conference, OSA 2016, pp. 1-3) (Year: 2016).*

Chen et al (Novel Nonreciprocal waveguide grating based on SOI: Characteristics and Application, IEEE Explorer, 2009, pp. 175-177) (Year: 2009).*

(Continued)

*Primary Examiner* — Stephone B Allen
*Assistant Examiner* — Jyotsna V Dabbi
(74) *Attorney, Agent, or Firm* — Sandberg Phoenix & von Gontard P.C.

(57) ABSTRACT

A dust-proof covering element is provided to close a projection aperture located in the dashboard of a vehicle and through which the information-carrying source light beam projected by the projecting module of a head-up display device passes on its way to a partially reflective return (Continued)

element. The covering element comprises a transparent carrier and an optical coating placed on one of the faces of the carrier; wherein, the optical coating comprises a metal layer with plasmonic properties, said metal layer being endowed with an array of subwavelength nanoperforations, and being configured to allow the extraordinary transmission of one or more restricted bands of wavelengths of the visible spectrum that are centered on the one or more wavelengths of the light beam projected by the projecting module.

9 Claims, 1 Drawing Sheet

(56)  References Cited

FOREIGN PATENT DOCUMENTS

| | | |
|---|---|---|
| FR | 3049720 A1 | 10/2017 |
| GB | 2569208 A | 6/2019 |
| WO | WO-2019088291 A1 * 5/2019 | ............. B60K 35/00 |

OTHER PUBLICATIONS

International Search Report for PCT/FR2020/051487 mailed Dec. 8, 2020.
Written Opinion for PCT/FR2020/051487 mailed Dec. 8, 2020.
Steven Larson et al. "The extraordinary optical transmission and sensing properties of Ag/Ti composite nanohole arrays" Physical Chemistry Chemical Physics, vol. 21, No. 7, Feb. 13, 2019, pp. 3771-3780 DOI: 10.1039/C8CP07729K ISSN: 1463-9076, XP055697067.

* cited by examiner

[Fig. 1]
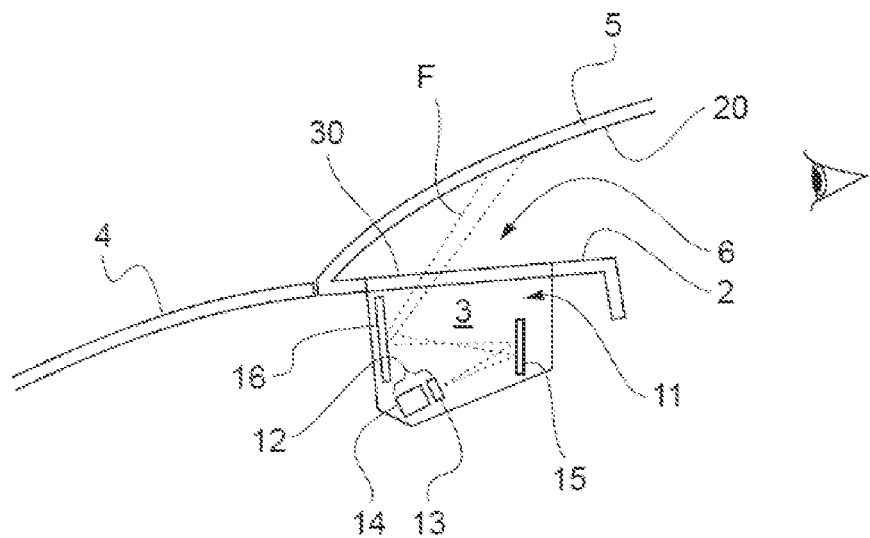
[Fig. 2]
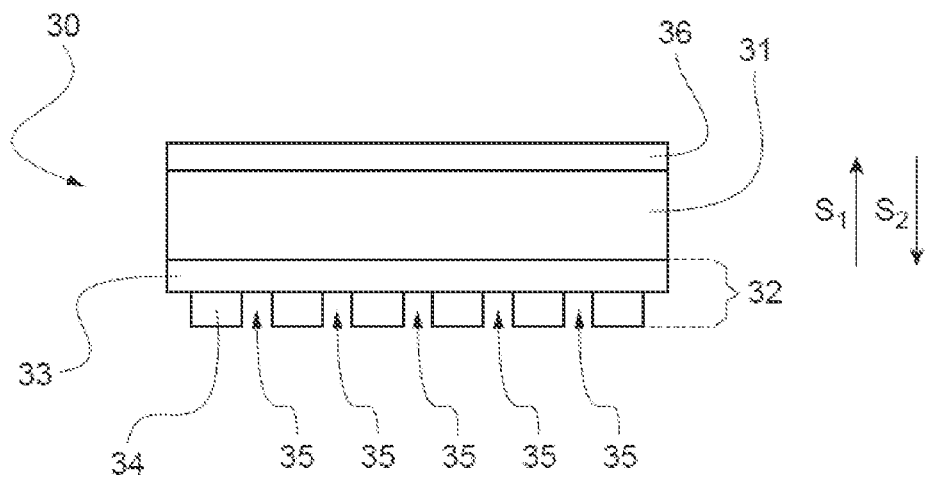

ELEMENT FOR COVERING THE PROJECTION APERTURE OF A HEADS-UP DISPLAY DEVICE

CROSS-REFERENCE TO RELATED APPLICATIONS

This application is the US National Stage under 35 USC § 371 of International Application No. PCT/FR2020/051487, filed 10 Aug. 2020 which claims priority to French Application No. 1909989 filed 11 Sep. 2019, both of which are incorporated herein by reference.

TECHNICAL FIELD

The invention relates to a dust-proof covering element arranged to close a projection aperture located in the dashboard of a vehicle and through which an information-carrying source light beam projected by a projecting module of a heads-up display device passes on its way to a partially reflective return element.

BACKGROUND

In the context of improving road safety, for several years motor vehicle manufacturers have been using heads-up display devices, which are generally designated by the acronym HUD (for Heads Up Display), to allow information to be projected into the driver's field of vision in front of the motor vehicle.

This type of display device comprises a projecting module housed in a cavity provided under the dashboard and projects an information-carrying source light beam to a return element adapted to reflect part of the light rays coming from said projecting module toward the driver of the motor vehicle so that said driver sees this information in the form of a virtual image located a few meters in front of the vehicle in an area on the hood or on the road without modifying the focus of the eyes.

Depending on the devices, the return element is formed either by a film incorporated directly in the windshield of the vehicle, or by a lamina independent of the windshield and protruding from the dashboard.

Directly above the projecting module, the upper side of the dashboard has an aperture located in the path of the light beam between the projecting module and the return element.

In order to protect the projecting module from dust, it is known to close this aperture with a covering element comprising a transparent carrier possibly covered on one of its faces with a coating that reflects infrared rays so that said rays may not penetrate inside the cavity which houses the projecting module so as to prevent a temperature rise in the cavity.

Document FR 3 044 113 A1 discloses such a covering element comprised of a polarizing filter and a polarization modifying element located between the polarizing filter and the projecting module. The polarization modifying element makes it possible to modify the polarization of the incident light beam coming from the projecting module between a first type of circular polarization and a second type of linear polarization. The polarizing filter only lets light rays pass which correspond to the second type of linear polarization in a certain direction of polarization.

This combination of polarization modifying elements and a polarizing filter in the covering element of a heads-up display device, in particular a heads-up display device reflected directly by the windshield, makes it possible to avoid stray reflections of sunlight in the heads-up display device in the case of directly incident solar radiation so as not to blind the driver who is looking at the heads-up display device.

However, these transparent covering elements have the drawback of leaving the optical components of the projecting module visible to the eyes of observers located outside the vehicle and looking through the windshield, which negatively impacts the level of perceived quality of the vehicle.

SUMMARY

This invention therefore aims to improve the above-described situation.

To improve upon the situation described above, a dust-proof covering element is provided which is arranged to close a projection aperture located in the dashboard of a vehicle and through which an information-carrying source light beam projected by the projecting module of a heads-up display device passes on its way to a partially reflective return element, said covering element comprising a transparent carrier as well as an optical coating placed on one of the faces of said carrier; wherein said optical coating comprises a metal layer with plasmonic properties, provided with an array of subwavelength nanoperforations, and configured to allow the extraordinary transmission of one or more restricted bands of wavelengths of the visible spectrum centered on the wavelength or wavelengths of the light beam projected by said projecting module.

The dust-proof covering element thus makes it possible to not disturb the transmission of the wavelengths of the beam emitted by the projecting module of the heads-up display device toward the partially reflective return element, while preventing most of the components of the exterior sunlight from passing through the covering element so as to at least partially conceal the optical components of the projecting module from the eyes of observers located outside the vehicle and looking through the windshield.

According to preferred features of said dust-proof covering element:
said optical coating comprises a layer of transparent magneto-optical material interposed between said carrier and said metal layer and interacting with said layer to make said extraordinary transmission non-reciprocal so that said wavelength or wavelengths of the light beam projected by said projecting module are transmitted only in the direction going from this projecting module toward said return element, and so that the other visible wavelengths of said restricted band or bands are transmitted only in the opposite direction going from the return element to the projecting module;
said layer of magneto-optical material is made of garnet oxide;
said metal layer is made of gold or silver;
said restricted band or bands of wavelengths have a width of between 10 and 100 nm;
said metal layer is configured to allow the extraordinary transmission of three of said restricted bands of wavelengths centered on the three wavelengths associated with the RGB system;
said array of subwavelength nanoperforations is periodic;
said array of subwavelength nanoperforations is formed of a plurality of concentric circular nanoperforations, of circular nanoperforations of identical dimensions and arranged in matrix form, or even of parallel linear nanoperforations regularly spaced from each other; and or said covering element also comprises a second anti-reflective optical coating affixed to the other face of said transparent carrier.

In a second aspect, a motor vehicle comprises a heads-up display device provided with a projecting module installed under the dashboard and adapted to emit an information-carrying source light beam to a partially reflective return element, said light beam passing through an aperture in the dashboard and being closed by said dust-proof covering element.

BRIEF DESCRIPTION OF THE FIGURES

The description of the claimed invention will now continue with the detailed description of an embodiment, given hereinafter by way of illustration but not limitation, with reference to the appended drawings, wherein:

FIG. 1 shows a schematic view in vertical longitudinal cross section of the front part of a motor vehicle comprising a heads-up display device comprising a projecting module installed under the dashboard of said vehicle directly under an aperture with a passage closed by a covering element; and FIG. 2 is an enlarged cross-sectional view of the covering element of FIG. 1.

DETAILED DESCRIPTION

FIG. 1 is a schematic view in vertical longitudinal cross section of the front part of a motor vehicle, the dashboard 2 of which incorporates a heads-up display device.

This display device comprises a projecting module 11 housed in a cavity 3 provided under the dashboard 2 and intended to project an information-carrying source light beam F to a transparent return element 20 adapted to reflect a part of the light rays coming from this projecting module 11 toward the eyes of the driver of the motor vehicle so that said driver sees this information in the form of a virtual image located a few meters in front of the vehicle in a zone on the hood 4 or on the road without modifying the focus of the eyes.

Among the information projected, mention may be made, for example, of the speed of the vehicle, the maximum speed authorized on the traffic route taken, the number of kilometers traveled since the last reset of the trip odometer, the remaining range of the vehicle in terms of amount of fuel or kilometers, alerts relating to safety distances or respect of the traffic route, or even parking aids.

The return element is formed of a film 20 incorporated in the windshield 5 of the vehicle. This film 20 is sufficiently transparent to allow part of the ambient light rays coming from the environment to pass through while being sufficiently reflective to send part of the light rays coming from said projecting module 11 toward the driver so that said driver sees the information projected in the form of a virtual image located a few meters in front of the vehicle in an area on the hood or on the road without modifying the focus of the eyes.

The projecting module 11 comprises a projector 12 formed of an RGB-type color display 13 (for example, an LCD panel, each pixel of which is composed of three adjacent red, green, and blue sub-pixels) associated with a back-illuminating light source 14 (for example a laser diode or a high power LED).

This projecting module 11 also comprises an optical system provided in particular with several aspherical deflection mirrors 15, 16 adapted to reflect the light beam coming from the projector 12 onto the return element 20.

Directly above the projecting module 11, the upper face of the dashboard 2 has an aperture 6 located along the path of the light beam between the projecting module 11 and the return element 20.

In order to prevent the introduction of foreign objects into the cavity 3 and to protect the projecting module 11 from dust, this aperture 6 is closed by a covering element 30.

Referring to FIG. 2, this covering element 30 comprises an optical coating 32 affixed by bonding or by electronic lithography on the inner face (the one facing toward the projecting module 11) of a carrier 31 made of transparent material, which may be glass or a plastic polymer such as, for example, polyvinyl butyral (PVB) or even polyethylene terephthalate (PET).

The optical coating 32 comprises a layer 33 of transparent magneto-optical material (advantageously garnet oxide) covered with a metal layer 34 having plasmonic properties in the visible spectrum.

The metal layer 34 has an array of periodically spaced nanoperforations 35, the dimensions of which are much smaller than the wavelength of the incident radiation (said nanoperforations being thus referred to as subwavelength nanoperforations).

Due to their physical features, these nanometric perforations have extraordinary transmission properties for certain wavelengths of the visible spectrum.

For a certain incident wave having a given wavelength greater than the dimensions of the nanoperforations of the array, a resonance phenomenon occurs with the surface plasmons resulting in a peak in transmission of this incident wave.

This transmission is described as extraordinary because it greatly exceeds (by a factor that may reach several tens) the cumulative contributions of each nanoperforation of the array taken individually.

The wavelengths for which the metal layer 34 provides extraordinary transmission may be adjusted by adjusting the shape and depth of the array of subwavelength nanoperforations 35, the difference between the refractive indices of the materials, or the harmonic of the array.

The array of subwavelength nanoperforations 35 may for example be formed of a plurality of concentric circular nanoperforations, circular nanoperforations of identical dimensions and arranged in matrix form, or even parallel linear nanoperforations regularly spaced from each other.

The thickness of the metal layer 34 defining the depth of these subwavelength nanoperforations 35 may thus advantageously be between a few tens and a few hundreds of a nanometer.

This metal layer 34 is moreover preferably made of a metal having a good propagation length for electric plasmons in the wavelengths of the visible spectrum, such as gold or silver or even platinum, copper or aluminum.

The metal layer 34 is configured to allow the extraordinary transmission of certain restricted bands of visible wavelengths having a width of 10 to 100 nm and being centered on the wavelengths of the projected light beam by the projecting module 11, namely the wavelengths 700 nm, 546.1 nm and 435.9 nm respectively associated with the red, green, and blue colors of the RGB system.

Furthermore, the magneto-plasmonic interaction occurring at the interface between the metal layer 34 and the layer of transparent magneto-optical material 33 (interposed between the metal layer 34 and the carrier 31) makes this extraordinary transmission non-reciprocal.

More precisely, the optical coating 32 is configured so that the wavelengths used by the display 13 of the projecting module 11 (in this case, the wavelengths of the RGB system) are transmitted only in the direction $S_1$ going from said projecting module 11 to the return element 20, and so that the other visible wavelengths of the restricted bands are transmitted only in the opposite direction $S_2$ going from the return element 20 to the projecting module 11.

The covering element 30 thus makes it possible to ensure the transmission of the light beams originating from the projecting module 11 to the return element 20, while preventing the entire visible spectrum of the ambient light coming from outside the vehicle from penetrating it in both directions so as to hide the optical components of the projecting module 11 located in the cavity 3 from the eyes of observers located outside the vehicle looking through this covering element 30.

The covering element 30 may also advantageously comprise a second anti-reflective optical coating 36 affixed to the outer surface (i.e., the surface facing in the direction of the return element 20) of the transparent carrier 31 and making it possible to prevent this covering element 30 from reflecting the outside light.

According to variant embodiments not shown, the display of the projecting module is monochromatic (for example of amber color). In such a case, the metal layer is configured to allow the extraordinary transmission of a single restricted band of visible wavelengths centered on the wavelength used by this display (for example, the wavelength 590 nm associated with the color amber).

According to other variant embodiments not shown, the covering element lacks the layer of magneto-optical material. In such a case, a small part of the components of the outside sunlight may pass through the covering element in both directions, so that certain optical components of the projecting module may remain visible to the eyes of observers located outside the vehicle.

According to yet other variant embodiments not shown, the semi-reflective transparent return element may be formed of a lamina independent of the windshield and protruding from the dashboard.

The invention claimed is:

1. A dust-proof covering element arranged to close a projection aperture in a dashboard of a vehicle and through which an information-carrying source light beam projected by a projecting module from a heads-up display device passes on its way to a partially reflective return element, said covering element comprising a transparent carrier and an optical coating placed on a face of said transparent carrier; wherein said optical coating comprises a metal layer having plasmonic properties, said metal layer being provided with an array of subwavelength nanoperforations, and configured to allow an extraordinary transmission of one or more restricted bands of wavelengths of the visible spectrum that are centered on one or more wavelengths of the light beam projected by said projecting module, wherein said optical coating comprises a layer of transparent magneto-optical material interposed between said transparent carrier and said metal layer and interacting with said metal layer to make said extraordinary transmission non-reciprocal so that said wavelength or wavelengths of the light beam projected by said projecting module are transmitted only in a first direction going from this projecting module toward said return element, and so that the other visible wavelengths of said restricted band or bands are transmitted only in an opposite second direction going from the return element toward the projecting module.

2. The covering element according to claim 1, wherein said layer of magneto-optical material is made of garnet oxide.

3. The covering element according to claim 1, wherein said metal layer is made of gold or silver.

4. The covering element according to claim 1, wherein said restricted band or bands of wavelengths have a width of between 10 and 100 nm.

5. The covering element according to claim 1, wherein said metal layer is configured to allow the extraordinary transmission of three of said restricted bands of wavelengths centered on three wavelengths associated with the RGB system.

6. The covering element according to claim 1, wherein said array of subwavelength nanoperforations is periodic.

7. The covering element according to claim 1, wherein said array of subwavelength nanoperforations comprises a plurality of concentric circular nanoperforations, circular nanoperforations of identical dimensions and arranged in matrix form, or parallel linear nanoperforations regularly spaced from each other.

8. The covering element according to claim 1, wherein said covering element further comprises a second an anti-reflection optical coating affixed to a second face of said transparent carrier.

9. A motor vehicle comprising a heads-up display device provided with a projecting module installed under the dashboard and capable of emitting an information-carrying source light beam to a partially reflective return element, said light beam passing through an aperture and being closed by the dust-proof covering element of claim 1.

* * * * *